United States Patent
Li et al.

(10) Patent No.: US 9,465,932 B2
(45) Date of Patent: Oct. 11, 2016

(54) ANTI-PEEPING DISPLAY SYSTEM AND METHOD, ANTI-PEEPING DISPLAY AND ANTI-PEEPING GLASSES

(71) Applicants: BOE TECHNOLOGY GROUP CO., LTD., Beijing (CN); BEIJING BOE DISPLAY TECHNOLOGY CO., LTD., Beijing (CN)

(72) Inventors: Xiaoguang Li, Beijing (CN); Jianfeng Yuan, Beijing (CN); Hongjiang Wu, Beijing (CN); Jingjing Jiang, Beijing (CN); Yu Xiao, Beijing (CN); Min Li, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 134 days.

(21) Appl. No.: 14/497,518

(22) Filed: Sep. 26, 2014

(65) Prior Publication Data
US 2015/0371029 A1    Dec. 24, 2015

(30) Foreign Application Priority Data
Jun. 18, 2014  (CN) .......................... 2014 1 0273466

(51) Int. Cl.
| G06F 21/00 | (2013.01) |
| G06F 21/44 | (2013.01) |
| G02C 7/12 | (2006.01) |
| G02B 27/28 | (2006.01) |
| G02B 26/02 | (2006.01) |
| G02C 7/16 | (2006.01) |
| G06F 21/84 | (2013.01) |
| G02C 11/00 | (2006.01) |

(52) U.S. Cl.
CPC ............... *G06F 21/44* (2013.01); *G02B 26/02* (2013.01); *G02B 27/286* (2013.01); *G02C 7/12* (2013.01); *G02C 7/16* (2013.01); *G06F 21/84* (2013.01); *G02C 11/10* (2013.01)

(58) Field of Classification Search
CPC .......... G06F 21/44; G02C 7/12; G02C 7/16; G02C 11/10; G02B 27/286; G02B 26/02
See application file for complete search history.

(56) References Cited

U.S. PATENT DOCUMENTS

2003/0118183 A1*  6/2003  Struyk .................... G06F 21/84
                                                            380/213

(Continued)

*Primary Examiner* — Mohammad A Siddiqi
(74) *Attorney, Agent, or Firm* — Harness, Dickey & Pierce, P.L.C.

(57) ABSTRACT

The present disclosure discloses an anti-peeping display system includes an anti-peeping display, anti-peeping glasses and a controller. The anti-peeping display includes a first polarizer and a first driving device driving the first polarizer to rotate. The anti-peeping glasses include a second polarizer and a second driving device driving the second polarizer to rotate. When judging that both of the obtained display password and the obtained glasses password are correct, the controller is configured to control the first polarizer and the second polarizer to rotate at a same angular velocity; otherwise, control the first driving device and the second driving device to rotate at different angular velocities.

17 Claims, 2 Drawing Sheets

(56) References Cited

U.S. PATENT DOCUMENTS

| | | | | |
|---|---|---|---|---|
| 2006/0232606 A1* | 10/2006 | Kim | ................ | G09G 5/00 345/620 |
| 2007/0096946 A1* | 5/2007 | Kim | ................ | G09C 1/00 341/22 |
| 2012/0069550 A1* | 3/2012 | Tung | ................ | G09F 13/18 362/97.1 |
| 2013/0076785 A1* | 3/2013 | Chen | ................ | G09G 3/001 345/629 |
| 2013/0148326 A1* | 6/2013 | Goldfain | ................ | G01J 3/0224 362/19 |
| 2013/0300705 A1* | 11/2013 | Goo | ................ | G02F 1/13338 345/174 |
| 2013/0314515 A1* | 11/2013 | Shestak | ................ | G02B 27/26 348/57 |
| 2014/0192281 A1* | 7/2014 | Smithwick | ................ | G02F 1/1313 349/15 |
| 2015/0193625 A1* | 7/2015 | Sumi | ................ | G06F 21/60 345/697 |

\* cited by examiner

ANTI-PEEPING DISPLAY SYSTEM AND METHOD, ANTI-PEEPING DISPLAY AND ANTI-PEEPING GLASSES

CROSS-REFERENCE TO RELATED APPLICATION

This application claims priority to Chinese Patent Application No. 201410273466.9 filed on Jun. 18, 2014, the disclosures of which are incorporated in their entirety by reference herein.

TECHNICAL FIELD

The present disclosure relates to the field of display technologies, and more particularly to an anti-peeping display system and method, an anti-peeping display and anti-peeping glasses.

BACKGROUND

As technology advances, displays have become main terminals for disseminating information. At present, information security in some important fields get more and more attention, in order to prevent personal and national information from being peeped by criminals, more and more anti-peeping techniques are used in the displays.

As shown in FIG. 1, a current mainstream anti-peeping system includes an anti-peeping display 101 and anti-peeping glasses 102. The anti-peeping display 101 includes a display body 1011, a first polarizer 1012 and a backlight 1013 which are sequentially stacked together. The anti-peeping glasses 102 include a glasses body 1021 and a second polarizer 1022 disposed in the glasses body 1021. Polarizing axis directions of the first polarizer 1012 and the second polarizer 1022 are perpendicular to each other, thus, only on the premise of wearing the anti-peeping glasses 102, a user may clear observe pictures presented on the anti-peeping display 101.

However, the above anti-peeping display system has a bid disadvantage: once the polarizing axis direction of the first polarizer 1012 of the anti-peeping display 101 is leaked, the anti-peeping glasses 102 matching with the anti-peeping display 101 may be reproduced according to the polarizing axis direction; or, even without knowing the polarizing axis direction of the first polarizer 1012, the anti-peeping glasses 102 may also be easily reproduced through limited experiments, thereby resulting leakage of user information.

SUMMARY

Embodiments of the present disclosure provide an anti-peeping display system and method, an anti-peeping display and anti-peeping glasses, to solve the problem of the leakage of user information caused by reproduction of anti-peeping glasses and to securely and effectively protect user information.

In order to achieve the above object, one embodiment of the present disclosure adopts following technical solution.

An anti-peeping display system includes an anti-peeping display, anti-peeping glasses and a controller; wherein the anti-peeping display comprises a display body, a first polarizer stacked on the display body, and a first driving device coupled with the first polarizer; the first driving device drives the first polarizer to rotate; the anti-peeping glasses comprise a glasses body, a second polarizer stacked on the glasses body, and a second driving device coupled with the second polarizer; the second driving device drives the second polarizer to rotate; the controller is configured to, when the anti-peeping display system is turned on, issue an instruction for inputting a display password and an instruction for inputting a glasses password, obtain an input display password and an input glasses password, judge whether the obtained display password is identical to a default display password and judge whether the obtained glasses password is identical to a default glasses password; when the obtained display password is identical to the default display password and the obtained glasses password is identical to the default glasses password, control the first driving device and the second driving device, respectively, to make the first polarizer and the second polarizer rotate at a same angular velocity; when the obtained display password is different from the default display password and/or the obtained glasses password is different from the default glasses password, control the first driving device and the second driving device, respectively, to make the first polarizer and the second polarizer rotate at different angular velocities.

Optionally, there is a buffer time between issuing the instruction for inputting a display password as well as the instruction for inputting a glasses password, and obtaining the input display password and the input glasses password; when not obtaining the display password and the glasses password after the buffer time, the controller controls the first polarizer and the second polarizer to rotate at different angular velocities.

Optionally, after the controller controls the first polarizer and the second polarizer to rotate at different angular velocities for a preset time, the controller controls the anti-peeping display system to shut down.

Optionally, when the anti-peeping display system shuts shown, the controller restores the first polarizer and the second polarizer to a state in which polarizing axes of the first polarizer and the second polarizer are perpendicular to each other.

Optionally, the default display password and the default glasses password are the same or different from each other.

Optionally, the anti-peeping display is directly connected with the controller, and the anti-peeping glasses are connected with the controller through a wireless connection.

Optionally, the anti-peeping display system further includes a first wireless communication module connected with the controller and a second wireless communication module connected with the anti-peeping glasses; the first wireless communication module and the second wireless communication module are configured to send an instruction which is issued from the controller to the anti-peeping glasses to the anti-peeping glasses, and send the input glasses password to the controller.

Optionally, the anti-peeping glasses further include a buzzer connected with the second wireless communication module; the buzzer is configured to, when the anti-peeping glasses are lost, issue an alert under control of the controller to facilitate a user finding the anti-peeping glasses.

Optionally, wherein the anti-peeping glasses further include: a glasses password input device connected with the second wireless communication module; a glasses password input display screen connected with the glasses password input device.

Optionally, the first driving device and the second driving device are stepper motors.

One embodiment of the present disclosure provides an anti-peeping display applied in the above anti-peeping display system; the anti-peeping display includes a display body, a first polarizer stacked on the display body, and a first driving device coupled with the first polarizer; wherein the first driving device drives the first polarizer to rotate.

Optionally, the first driving device is a stepper motor.

One embodiment of the present disclosure further provides anti-peeping glasses applied in the above anti-peeping display system; the anti-peeping glasses include a glasses body, a second polarizer stacked on the glasses body, and a second driving device coupled with the second polarizer; wherein the second driving device drives the second polarizer to rotate.

Optionally, the second driving device is a stepper motor.

Optionally, the anti-peeping glasses further include a glasses password input device and a glasses password input display screen.

One embodiment of the present disclosure further provides an anti-peeping display method applied in the above anti-peeping display system, the method includes: when the anti-peeping display system is turned on, issuing an instruction for inputting a display password and an instruction for inputting a glasses password; obtaining an input display password and an input glasses password; judging whether the obtained display password is identical to a default display password and judging whether the obtained glasses password is identical to a default glasses password; when the obtained display password is identical to the default display password and the obtained glasses password is identical to the default glasses password, controlling a first polarizer of an anti-peeping display of the anti-peeping display system and a second polarizer of anti-peeping glasses of anti-peeping display system to rotate at a same angular velocity; when the obtained display password is different from the default display password and/or the obtained glasses password is different from the default glasses password, controlling the first polarizer and the second polarizer to rotate at different angular velocities.

Optionally, there is a buffer time between issuing the instruction for inputting a display password as well as the instruction for inputting a glasses password, and obtaining the input display password and the input glasses password; when not obtaining the display password and the glasses password after the buffer time, controlling the first polarizer and the second polarizer to rotate at different angular velocities.

Optionally, after controlling the first polarizer and the second polarizer to rotate at different angular velocities for a preset time, shutting down the anti-peeping display system.

Optionally, when the anti-peeping display system shuts shown, restoring the first polarizer and the second polarizer to a state in which polarizing axes of the first polarizer and the second polarizer are perpendicular to each other.

Optionally, the controlling the first polarizer and the second polarizer to rotate at different angular velocities includes:

making the angular velocity of the first polarizer greater than zero, and making the angular velocity of the second polarizer equal to zero In the anti-peeping display system and method, the anti-peeping display and the anti-peeping glasses, polarizers of the anti-peeping display and the anti-peeping glasses may be driven to rotate by respective driving devices under control of the controller. When the anti-peeping display system is turned on, the controller prompts a user to input a display password and a glasses password, respectively. Only when the input display password is identical to the default display password and the input glasses password is identical to the default glasses password, the controller controls the respective driving devices of the display and the glasses to drive the first polarizer and the second polarizer to synchronously rotate, so as to keep an angle between the polarizing axes of the first polarizer and the second polarizer unchanged (the polarizing axes of the first polarizer and the second polarizer are maintained in a state perpendicular to each other all the time), an operator may clearly observe information displayed on the display. In other cases such as when the display password input by the operator is different from the default display password, and/or the glasses password input by the operator is different from the default glasses password, the controller controls the polarizers of the display and the glasses to rotate at different angular velocities, so that the angle between the polarizing axes of the two polarizers is changing all the time (the polarizing axes of the two polarizers cannot be maintained in a state perpendicular to each other all the time), and thus, the operator cannot clearly observe displayed pictures. Thus, in the anti-peeping display system, through making the polarizer of the display and the polarizer of the glasses to rotate under control of the controller in combination with the password protection, the problem of the leakage of user information caused by reproduction of anti-peeping glasses may be avoided, thereby achieving the purpose of securely and effectively protecting the user information.

BRIEF DESCRIPTION OF THE DRAWINGS

In order to illustrate technical solutions according to embodiments of the present disclosure or in the prior art more clearly, drawings to be used in the description of the prior art or the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

In order to make the above objects, features and advantages of the embodiments of the present disclosure more clear, the technical solutions according to the embodiments of the present disclosure will be clearly and fully described hereinafter in conjunction with the accompanying drawings in the embodiments of the present disclosure. Apparently, the embodiments are only some of the embodiments of the present disclosure, rather than all the embodiments. Based on the described embodiments of the present disclosure, all other embodiments that are acquired by those skilled in the art without inventive work are all within the scope of protection of the present disclosure.

First Embodiment

Figure 1:
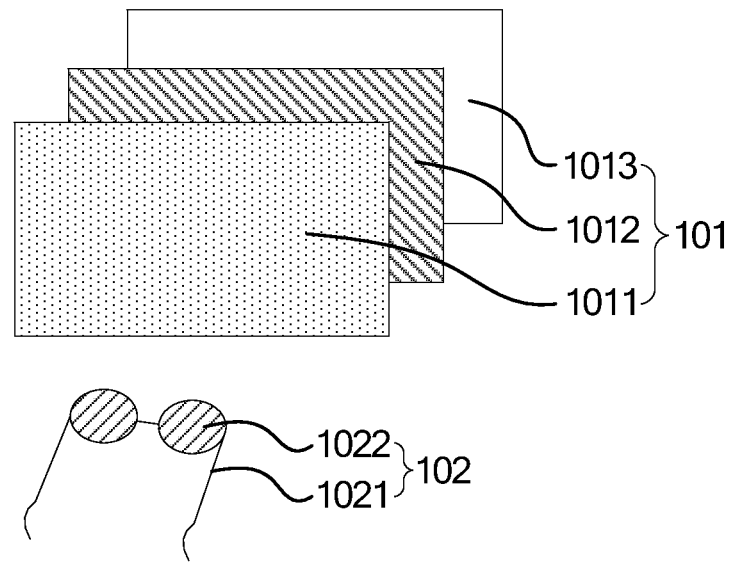
FIG. 1 is a schematic diagram showing a structure of an anti-peeping display system in the prior art.
Figure 2:
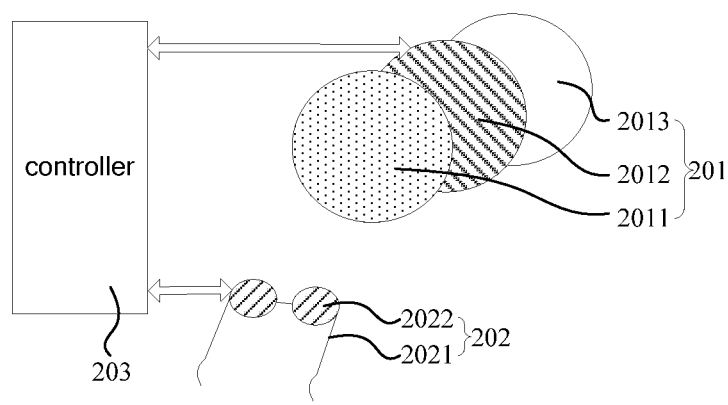
FIG. 2 is a schematic diagram showing a structure of an anti-peeping display system according to one embodiment of the present disclosure.

This embodiment provides an anti-peeping display system. As shown in FIG. 2, the anti-peeping display system includes an anti-peeping display 201, anti-peeping glasses 202 and a controller 203.

The anti-peeping display 201 includes a display body 2011, a first polarizer 2012 stacked on the display body 2011, and a first driving device (not shown) coupled with the first polarizer 2012. The first driving device may drive the first polarizer 2012 to rotate.

The anti-peeping glasses 202 include a glasses body 2021, a second polarizer 2022 stacked on the glasses body 2021, and a second driving device (not shown) coupled with the second polarizer 2022. The second driving device may drive the second polarizer 2022 to rotate.

When the anti-peeping display system is turned on, the controller 203 issues an instruction for inputting a display password and an instruction for inputting a glasses password, obtains an input display password and an input glasses password, judges whether the obtained display password is identical to a default display password and judges whether the obtained glasses password is identical to a default glasses password. When the obtained display password is identical to the default display password and the obtained glasses password is identical to the default glasses password, the first driving device and the second driving device are controlled, respectively, to make the first polarizer 2012 and the second polarizer 2022 rotate at a same angular velocity. In one embodiment, the angular velocity is greater than zero. When the obtained display password is different from the default display password and/or the obtained glasses password is different from the default glasses password, the first driving device and the second driving device are controlled, respectively, to make the first polarizer 2012 and the second polarizer 2022 rotate at different angular velocities. In one embodiment, making the first polarizer 2012 and the second polarizer 2022 rotate at different angular velocities may specifically include: making the angular velocity of the first polarizer 2012 greater than zero, and making the angular velocity of the second polarizer 2022 equal to zero.

In the above anti-peeping display system, the controller 203 is used to control the first driving device to drive the first polarizer 2012 of the anti-peeping display 201 to rotate, and control the second driving device to drive the second polarizer 2022 of the anti-peeping glasses 202 to rotate. After the system is turned on, the controller 203 first prompts a user to input the display password and the glasses password. Only when the input display password is identical to the default display password and the input glasses password is identical to the default glasses password, the controller 203 controls the first polarizer 2012 and the second polarizer 2022 to synchronously rotate. In other cases, the controller 203 controls the first polarizer 2012 and the second polarizer 2022 to asynchronously rotate. During the synchronous rotation, the polarizing axes of the first polarizer 2012 and the second polarizer 2022 are maintained in a state perpendicular to each other all the time, an operator may clearly observe displayed pictures. During the asynchronous rotation, an angle between the polarizing axes of the first polarizer 2012 and the second polarizer 2022 is changed all the time, and the first polarizer 2012 and the second polarizer 2022 cannot be maintained in a state perpendicular to each other, thus, the operator cannot clearly observe the displayed pictures. Thus, in the anti-peeping display system provided in this embodiment, through using the controller to control the polarizer of the display and the polarizer of the glasses to rotate at different states in combination with the password protection, the displayed pictures cannot be seen clearly even the anti-peeping glasses are reproduced, thereby enhancing information security of the display.

Optionally, the anti-peeping display 201 of the above anti-peeping display system may further include a backlight 2013 for providing sufficient light for the display body 2011 to display pictures.

It should be noted, an observer may clearly see the displayed pictured on the anti-peeping display 201 only when the polarizing axis directions of the first polarizer 2012 and the second polarizer 2022 are perpendicular to each other. This is because light emitted from the backlight 2013 is converted into a linearly polarized light after passing though the first polarizer 2012, and light transmitted from the display body 2011 is linearly polarized light; after the linearly polarized light reaches the anti-peeping glasses 202, only when the polarizing axis direction of the second polarizer 2022 is perpendicular to the polarizing axis direction of the first polarizer 2012, the linearly polarized light may be converted into a circularly polarized light after passing through the second polarizer 2022 and enter into the glasses of the observer, so that the observer can clearly see the displayed pictures.

A working process of the anti-peeping display system provided in this embodiment will be specifically introduced.

After the anti-peeping display system is turned on, the controller 203 issues an instruction for inputting a display password to the anti-peeping display 201 so as to prompt the operator to input the display password, and issues an instruction for inputting a glasses password to the anti-peeping glasses 202 so as to prompt the operator to input the glasses password.

The default display password and the default glasses password are pre-stored in the controller 203. After the operator inputs the passwords, the controller 203 may obtain the input display password from the anti-peeping display 201, compare the obtained display password with the default display password and judge whether the two are identical; the controller 203 may obtain the input glasses password from the anti-peeping glasses 202, compare the obtained glasses password with the default glasses password, and judge whether the two are identical.

Figure 3:
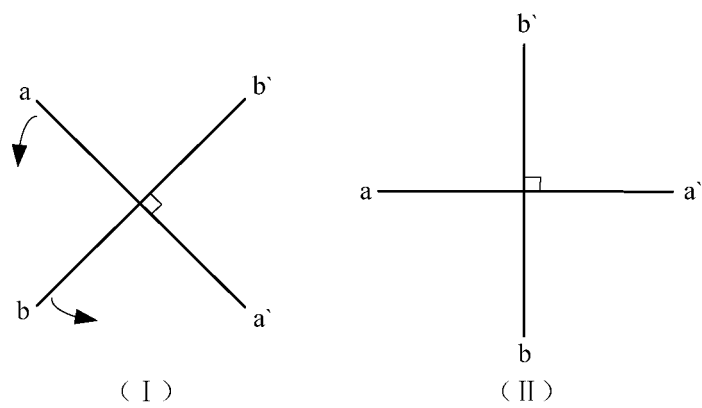
FIG. 3 is a schematic diagram showing rotations of a first polarizer and a second polarizer of the anti-peeping display system according to one embodiment of the present disclosure, when both of an input display password and an input glasses password are correct.

If the display password input by the operator is identical to the default display password, and the glasses password input by the operator is identical to the default glasses password, then the controller 203 issues an instruction for driving the first polarizer 2012 to rotate at a first angular velocity to the first driving device, and issues an instruction for driving the second polarizer 2022 to rotate at the first angular velocity to the second driving device, so that the first polarizer 2012 and the second polarizer 2022 begin to rotate at the same angular velocity. As shown in FIG. 3(I), the polarizing axis direction of the first polarizer 2012 is represented as aa', the polarizing axis direction of the second polarizer 2022 is represented as bb'; in an initial state (not begin to rotate), an angle between aa' and bb' is 90 degrees; then, the first polarizer 2012 and the second polarizer 2022 begin to rotate at the same angular velocity, i.e., the first angular velocity (for example, 5 radians/second). As shown in FIG. 3(II), after rotating for a period of time, since the angular velocity and rotating time of the first polarizer 2012 equals to the angular velocity and rotating time of the second polarizer 2022, thus, the angle between aa' and bb' is still 90 degrees, and the operator may clearly seen the displayed pictures all the time.

It should be noted, when both of the display password and the glasses password are matched correctly and the first polarizer 2012 and the second polarizer 2022 rotate at the same angular velocity, optionally, both of the first polarizer 2012 and the second polarizer 2022 continue rotating during the period when the operator observes the displayed pictures, until the anti-peeping display system is turned off, thereby achieving continuous protection of user information during an entire working process of the system, and further improving security of the user information.

Figure 4:
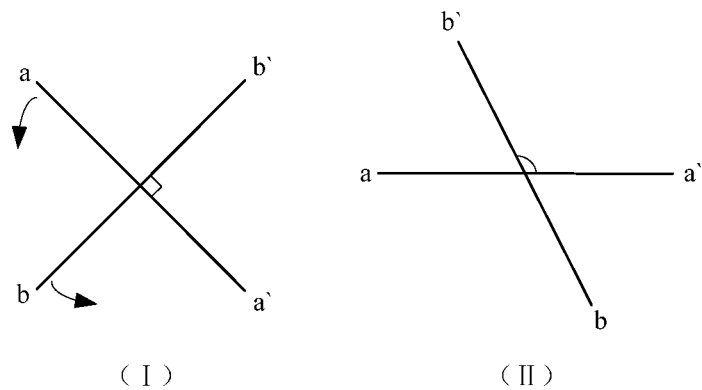
FIG. 4 is a schematic diagram showing rotations of the first polarizer and the second polarizer of the anti-peeping display system according to one embodiment of the present disclosure, when the input display password and/or the input glasses password is wrong.

If the display password input by the operator is different from the default display password, and/or the glasses password input by the operator is different from the default glasses password, then the controller 203 issues an instruction for driving the first polarizer 2012 to rotate at a second angular velocity to the first driving device, and issues an instruction for driving the second polarizer 2022 to rotate at a third angular velocity to the second driving device, the second angular velocity is different from the third angular velocity, so that the first polarizer 2012 and the second polarizer 2022 begin to rotate at different angular velocities. As shown in FIG. 4(I), the polarizing axis direction of the first polarizer 2012 is represented as aa', the polarizing axis direction of the second polarizer 2022 is represented as bb'; in an initial state (not begin to rotate), an angle between aa' and bb' is 90 degrees; then, the first polarizer 2012 begins to rotate at the second angular velocity, for example, 6 radians/second, and the second polarizer 2022 begins to rotate at the third angular velocity, for example, 3 radians/second. As shown in FIG. 4(II), after rotating for a period of time, since the angular velocity of the first polarizer 2012 is different from the angular velocity of the second polarizer 2022, thus, the angle between aa' and bb' is changing all the time; thus, although aa' and bb' may reach a state of perpendicular to each other, such a state is only for a moment and cannot remain unchanged, and therefore the operator cannot see the displayed pictures.

It should be noted, the angular velocity mentioned in this embodiment may be a vector having magnitude and direction.

In this embodiment, optionally, the angular velocities (i.e., the first angular velocity, the second angular velocity and the third angular velocity) of the first polarizer 2012 and the second polarizer 2022 during rotation may be set according to actual situations and will not be limited here. Considering the operator's sensory comfort when observing the anti-peeping display 201, the angular velocities of the first polarizer 2012 and the second polarizer 2022 may optionally be set to be smaller.

In addition, the above default display password and the default glasses password are data pre-stored in the controller, and may be arbitrarily set by the user according to needs. The default display password and the default glasses password may be the same, or different from each other. For example, each of the anti-peeping display 201 and the anti-peeping glasses 202 has an initial password when delivery from factory, in order to prevent password leakage, the user may change the initial passwords to other passwords; for another example, when the anti-peeping glasses 202 are lost, stolen or reproduced, in order to ensure the information security, the user may change the default display password and/or the default glasses password.

It should be noted, the display body 2011 in this embodiment may optionally be a liquid crystal display which does not include a polarizer, and the glasses body 2021 has a frame and lenses.

Since it takes a certain period of time for inputting the display password and the glasses password, thus, there is optionally a buffer time between issuing by the controller 203 the instruction for inputting the display password as well as instruction for inputting the glasses password, and obtaining the input the display body 2011 and the input glasses password. During the buffer time, the first polarizer 2012 and the second polarizer 2022 are in a stationary state.

When the controller 203 does not obtain the display password and the glasses password after the buffer time, the controller 203 may optionally make the first polarizer 2012 and the second polarizer 2022 rotate at different angular velocities. Within the buffer time, the operator may input passwords, or may not input passwords. If the operator does not input the display password and the glasses password, the controller 203 cannot obtain the display password and the glasses password after the buffer time. At this time, the controller 203 controls the first driving device to drive the first polarizer 2012 to rotate at the second angular velocity, and controls the second driving device to drive the second polarizer 2022 to rotate at the third angular velocity, the second angular velocity is different from the third angular velocity. Rotation states of the first polarizer 2012 and the second polarizer 2022 are similar to those shown in FIG. 4, i.e., an angle between a polarizing axis of the first polarizer 2012 and a polarizing axis of the second polarizer 2022 is changing all the time, and the polarizing axis of the first polarizer 2012 and the polarizing axis of the second polarizer 2022 cannot be maintained in a state perpendicular to each other. Thus, if the operator does not input the passwords within the buffer time, the operator cannot see the displayed pictures. This may avoid the problem that, on the premise of not knowing the passwords, criminals avoid such a situation in which the displayed pictures cannot be clearly observed due to wrong passwords in a way of not inputting passwords so as to achieve a purpose of stealing information; and this may make functions of the anti-peeping display system provided in this embodiment more perfect.

In this embodiment, after the controller 203 makes the first polarizer 2012 and the second polarizer 2022 rotate at different angular velocities for a preset time, the controller 203 may optionally control the anti-peeping display system to shut down, so as to further enhance the information security of the anti-peeping display 201 while saving energy.

It should be noted, the preset time during which the first polarizer 2012 and the second polarizer 2022 rotate at different angular velocities is not limited in this embodiment, and it may be set by users according to actual situations.

Further, when the anti-peeping display system shuts shown, the controller 203 may optionally restore the first polarizer 2012 and the second polarizer 2022 to a state in which the polarizing axes of the first polarizer 2012 and the second polarizer 2022 are perpendicular to each other. Thus, after the anti-peeping display system is turned on for the next time, when both of the input display password and glasses password are correct, the first polarizer 2012 and the second polarizer 2022 begin to rotate from the state in which the polarizing axes of the first polarizer 2012 and the second polarizer 2022 are perpendicular to each other, this may ensure that the polarizing axes of the first polarizer 2012 and the second polarizer 2022 are maintained perpendicular to each other all the time during the working process of the system.

It should be noted that a time when the above restoring action occurs is not limited to a time when the system shuts down; in one embodiment, restoring the first polarizer 2012 and the second polarizer 2022 may occur at any time between the time when the system shuts down and a time when the first polarizer 2012 and the second polarizer 2022 rotate for the next time.

In one embodiment, a connection between the controller 203 and the anti-peeping display 201 as well as a connection between the controller 203 and the anti-peeping glasses 202 may be wired connections, and also may be wireless connections.

Considering convenience for using, optionally, the anti-peeping display 201 is directly connected with the controller 203, and the anti-peeping glasses are connected with the controller 203 through a wireless connection. Specifically, the anti-peeping display 201 may be directly connected with the controller 203 through an interface such as a high definition multimedia interface (HDMI), a universal serial bus (USB), etc. A first wireless communication module is connected with the controller 203 and a second wireless communication module is connected with the anti-peeping glasses 202. The first wireless communication module and the second wireless communication module are used to send the instruction which is sent from the controller 203 to the anti-peeping glasses 202 to the anti-peeping glasses 202, send the input glasses password to the controller 203, so as to achieve wireless communication between the anti-peeping glasses 202 and the controller 203.

The above first wireless communication module may optionally be integrated with the controller 203 or the anti-peeping display 201; the second wireless communication module may optionally be integrated with the anti-peeping glasses 202.

Similarly, if requiring to achieve wireless communication between the anti-peeping display 201 and the controller 203, a wireless communication module may optionally be connected with the anti-peeping display 201 and a wireless communication module may optionally be connected with the controller 203; information interaction functions between the two wireless communication modules may be used to achieve functions of sending the instruction which is sent from the controller 203 to the anti-peeping display 201 to the anti-peeping display 201 and sending the input display password to the controller 203.

It should be noted, the above instruction which is sent from the controller 203 to the anti-peeping glasses 202 may optionally include: an instruction for inputting a glasses password, an instruction for obtaining the inputted glasses password, and an instruction for using the second driving device to drive the second polarizer 2022 to rotate at a certain angular velocity, etc. The instruction which is sent from the controller 203 to the anti-peeping display 201 may include: an instruction for inputting the display password, an instruction for obtaining the inputted display password, and an instruction for using the first driving device to drive the first polarizer 2012 to rotate at a certain angular velocity, etc.

Further, the anti-peeping glasses 202 may optionally include a buzzer connected with the second wireless communication module. The buzzer is configured to, when the anti-peeping glasses 202 are lost, issue an alert under control of the controller 203, so that the user may find the anti-peeping glasses 202. Specifically, when the anti-peeping glasses 202 are lost, within a communication range, the controller 203 issues an instruction for issuing an alert to the second wireless communication module through the first wireless communication module, the second wireless communication module sends the instruction to the buzzer to make the buzzer issuer an alert so as to find the anti-peeping glasses 202. This may avoid to some extent leakage of information caused by losing of the anti-peeping glasses 202, and further improve information security.

The above first wireless communication module and the second wireless communication module may optionally be general packet radio service (GPRS) communication modules, thereby providing a greater searchable range for the anti-peeping glasses and further avoiding leakage of information caused due to the anti-peeping glasses being lost or stolen.

In this embodiment, the anti-peeping glasses 202 may optionally include a glasses password input device connected with the second wireless communication module, and a glasses password input display screen connected with the glasses password input device. The glasses password input display screen may be used to observe whether the second wireless communication module has received the instruction for inputting a glasses password sent from the controller 203; if yes, the glasses password may be input through the glasses password input device, and it may be judged whether the input is correct by observing a password displayed on the glasses password input display screen, thereby achieving the purpose of improving convenience of the anti-peeping display system and further improving performance of the system.

In the anti-peeping display system provided in this embodiment, the first driving device of the anti-peeping display 201 and the second driving device of the anti-peeping glasses 202 may optionally be stepper motors, so as to better meet requirements of functions of the system. In other embodiments of the present disclosure, the first driving device and the second driving device may also be motors of other types.

Second Embodiment

This embodiment provides an anti-peeping display, which may be applied in the anti-peeping display system of the first embodiment. The anti-peeping display includes a display body, a first polarizer stacked on the display body, and a first driving device coupled with the first polarizer. The first driving device may drive the first polarizer to rotate.

The anti-peeping display provided in this embodiment includes a polarizer which may rotate relative to the display body and may be applied in the anti-peeping display system. Only when the input display password is identical to the default display password and the input glasses password is identical to the default glasses password, the controller controls the polarizer of the display and the polarizer of the glasses to synchronously rotate, so that the polarizing axes of the two polarizers are maintained perpendicular to each other all the time, and the operator may clearly observe the displayed pictures. In other cases, the polarizer of the display and the polarizer of the glasses asynchronously rotate, thereby effectively improving security of the user information.

In the above anti-peeping display, the first driving device configured to drive the first polarizer to rotate may optionally be a stepper motor, so as to better meet requirements of functions of the system.

Third Embodiment

This embodiment provides anti-peeping glasses, which may be applied in the anti-peeping display system of the first embodiment. The anti-peeping glasses include a glasses body, a second polarizer stacked on the glasses body, and a second driving device connected with the second polarizer. The second driving device drives the second polarizer to rotate.

This anti-peeping glasses provided in this embodiment are different from common anti-peeping glasses in the prior art, and the anti-peeping glasses provided in this embodiment include a polarizer which may rotate relative to the glasses body. Only when the input display password is identical to the default display password and the input glasses password is identical to the default glasses password, the controller controls the polarizer of the display and the polarizer of the glasses to synchronously rotate, so that the polarizing axes of the two polarizers are maintained perpendicular to each other all the time, and the operator may clearly observe the displayed pictures. In other cases, the polarizer of the display and the polarizer of the glasses asynchronously rotate, thereby effectively improving security of the user information.

In the above anti-peeping glasses, the second driving device configured to drive the second polarizer to rotate may optionally be a stepper motor, so as to better meet requirements of functions of the system.

In order to improve the convenience of the anti-peeping glasses and further improve performance of the anti-peeping glasses, the anti-peeping glasses provided in this embodiment may optionally include a glasses password input device and a glasses password input display screen. Functions of the glasses password input device and the glasses password input display screen refer to the first embodiment and will not be repeated here.

Fourth Embodiment

This embodiment provides an anti-peeping display method, which may be applied in the anti-peeping display system of the first embodiment. The method includes following steps.

when the anti-peeping display system is turned on, issuing an instruction for inputting a display password and an instruction for inputting a glasses password;

obtaining an input display password and an input glasses password;

judging whether the obtained display password is identical to a default display password and judging whether the obtained glasses password is identical to a default glasses password; when the obtained display password is identical to the default display password and the obtained glasses password is identical to the default glasses password, controlling the first polarizer of the anti-peeping display and the second polarizer of the anti-peeping glasses rotating at a same angular velocity; when the obtained display password is different from the default display password and/or the obtained glasses password is different from the default glasses password, controlling the first polarizer and the second polarizer to rotate at different angular velocities.

In the above anti-peeping display method, after the anti-peeping display system is turned on, first prompting an operator to input a display password and a glasses password; only when the input display password is identical to the default display password and the input glasses password is identical to the default glasses password, controlling the first polarizer and the second polarizer to synchronously rotate; in other cases, controlling the first polarizer and the second polarizer to asynchronously rotate. During the synchronous rotation, the polarizing axes of the first polarizer and the second polarizer are maintained in a state perpendicular to each other all the time, the operator may clearly observe information displayed on the display. During the asynchronous rotation, an angle between the polarizing axes of the first polarizer and the second polarizer is changing all the time, and the first polarizer and the second polarizer cannot be maintained in a state perpendicular to each other, thus, the operator cannot clearly observe the information displayed on the display. Thus, in the method provided in this embodiment, through making the polarizer of the display and the polarizer of the glasses to rotate at different states in combination with the password protection, the displayed pictures cannot be seen clearly even the anti-peeping glasses are reproduced, thereby effectively protect the user information.

In this embodiment, there is optionally a buffer time between issuing an instruction for inputting a display password as well as an instruction for inputting a glasses password, and obtaining the input display password and glasses password, so as to provide appropriate time for the operator to input the display password and glasses password.

When not obtaining the display password and the glasses password after the buffer time, optionally, controlling the first polarizer and the second polarizer to rotate at different angular velocities; this may avoid the problem that criminals avoid such a situation in which the displayed pictures cannot be clearly observed due to wrong passwords in a way of not inputting passwords so as to achieve a purpose of stealing information, thereby further enhancing the information security.

Based on the consideration of further enhancing the security of the user information while saving energy, after the first polarizer and the second polarizer are controlled to rotate at different angular velocities for a preset time, the anti-peeping display system may optionally be shut down.

On the premise that both of the input display password and the glasses password are correct, in order to make the first polarizer and the second polarizer always begin to rotate from the state in which the polarizing axes of the first polarizer and the second polarizer are perpendicular to each other so as to ensure that the polarizing axes of the first polarizer and the second polarizer are maintained perpendicular to each other all the time during the working process, when the anti-peeping display system shuts shown, the first polarizer and the second polarizer may optionally be restored to the state in which the polarizing axes of the first polarizer and the second polarizer are perpendicular to each other.

The foregoing are merely exemplary embodiments of the present disclosure. It should be appreciated that, a person skilled in the art may make further modifications and improvements without departing from the scope of the present disclosure, and these modifications and improvements should also be considered as within the scope of the present disclosure.

What is claimed is:

1. An anti-peeping display system comprising:
an anti-peeping display, anti-peeping glasses and a controller;
wherein the anti-peeping display comprises a display body, a first polarizer stacked on the display body, and a first driving device coupled with the first polarizer; the first driving device drives the first polarizer to rotate;
the anti-peeping glasses comprise a glasses body, a second polarizer stacked on the glasses body, and a second driving device coupled with the second polarizer; the second driving device drives the second polarizer to rotate;
the controller is configured to, when the anti-peeping display system is turned on, issue an instruction for inputting a display password and an instruction for inputting a glasses password, obtain an input display password and an input glasses password, judge whether the obtained display password is identical to a default display password and judge whether the obtained glasses password is identical to a default glasses password; when the obtained display password is identical to the default display password and the obtained glasses password is identical to the default glasses password, control the first driving device and the second driving device, respectively, to make the first polarizer and the second polarizer rotate at a same angular velocity; when the obtained display password is different from the default display password and/or the obtained glasses password is different from the default glasses password, control the first driving device and the second driving device, respectively, to make the first polarizer and the second polarizer rotate at different angular velocities.

2. The anti-peeping display system according to claim 1, wherein there is a buffer time between issuing the instruction for inputting a display password as well as the instruction for inputting a glasses password, and obtaining the input display password and the input glasses password; when not obtaining the display password and the glasses password after the buffer time, the controller controls the first polarizer and the second polarizer to rotate at different angular velocities.

3. The anti-peeping display system according to claim 2, wherein after the controller controls the first polarizer and the second polarizer to rotate at different angular velocities for a preset time, the controller controls the anti-peeping display system to shut down.

4. The anti-peeping display system according to claim 1, wherein when the anti-peeping display system shuts shown, the controller restores the first polarizer and the second polarizer to a state in which polarizing axes of the first polarizer and the second polarizer are perpendicular to each other.

5. The anti-peeping display system according to claim 1, wherein the default display password and the default glasses password are the same or different from each other.

6. The anti-peeping display system according to claim 1, wherein the anti-peeping display is directly connected with the controller, and the anti-peeping glasses are connected with the controller through a wireless connection.

7. The anti-peeping display system according to claim 6, further comprising a first wireless communication module connected with the controller and a second wireless communication module connected with the anti-peeping glasses; wherein the first wireless communication module and the second wireless communication module are configured to send an instruction which is issued from the controller to the anti-peeping glasses to the anti-peeping glasses, and send the input glasses password to the controller.

8. The anti-peeping display system according to claim 7, wherein the anti-peeping glasses further comprise a buzzer connected with the second wireless communication module; the buzzer is configured to, when the anti-peeping glasses are lost, issue an alert under control of the controller to facilitate a user finding the anti-peeping glasses.

9. The anti-peeping display system according to claim 7, wherein the anti-peeping glasses further comprise:
a glasses password input device connected with the second wireless communication module;
a glasses password input display screen connected with the glasses password input device.

10. The anti-peeping display system according to claim 1, wherein the first driving device and the second driving device are stepper motors.

11. An anti-peeping display for an anti-peeping display system having anti-peeping glasses and a controller, the anti-peeping display comprising:
a display body;
a first polarizer stacked on the display body; and
a first driving device coupled with the first polarizer;
wherein the first driving device drives the first polarizer to rotate and to continuously change a polarizing axis direction of the first polarizer to thereby prevent leakage of user information caused by reproduction of anti-peeping glasses,
wherein:
the anti-peeping glasses comprise a glasses body, a second polarizer stacked on the glasses body, and a second driving device coupled with the second polarizer; the second driving device drives the second polarizer to rotate; and
the controller is configured to, when the anti-peeping display system is turned on, issue an instruction for inputting a display password and an instruction for inputting a glasses password, obtain an input display password and an input glasses password, judge whether the obtained display password is identical to a default display password and judge whether the obtained glasses password is identical to a default glasses password; when the obtained display password is identical to the default display password and the obtained glasses password is identical to the default glasses password, control the first driving device and the second driving device, respectively, to make the first polarizer and the second polarizer rotate at a same angular velocity; when the obtained display password is different from the default display password and/or the obtained glasses password is different from the default glasses password, control the first driving device and the second driving device, respectively, to make the first polarizer and the second polarizer rotate at different angular velocities.

12. The anti-peeping display according to claim 11, wherein the first driving device is a stepper motor.

13. An anti-peeping display method applied in an anti-peeping display system,
wherein the anti-peeping display system comprises: an anti-peeping display, anti-peeping glasses and a controller;
wherein the anti-peeping display comprises a display body, a first polarizer stacked on the display body, and a first driving device coupled with the first polarizer; the first driving device drives the first polarizer to rotate;
the anti-peeping glasses comprise a glasses body, a second polarizer stacked on the glasses body, and a second driving device coupled with the second polarizer; the second driving device drives the second polarizer to rotate;
the controller is configured to, when the anti-peeping display system is turned on, issue an instruction for inputting a display password and an instruction for inputting a glasses password, obtain an input display password and an input glasses password, judge whether the obtained display password is identical to a default display password and judge whether the obtained glasses password is identical to a default glasses password; when the obtained display password is identical to the default display password and the obtained glasses password is identical to the default glasses password, control the first driving device and the second driving device, respectively, to make the first polarizer and the second polarizer rotate at a same angular velocity; when the obtained display password is different from the default display password and/or the obtained glasses password is different from the default glasses password, control the first driving device and the second driving device, respectively, to make the first polarizer and the second polarizer rotate at different angular velocities, the method comprising:
when the anti-peeping display system is turned on, issuing an instruction for inputting a display password and an instruction for inputting a glasses password;
obtaining an input display password and an input glasses password;
judging whether the obtained display password is identical to a default display password and judging whether the obtained glasses password is identical to a default glasses password; when the obtained display password is identical to the default display password and the obtained glasses password is identical to the default glasses password, controlling a first polarizer of an anti-peeping display of the anti-peeping display system and a second polarizer of anti-peeping glasses of anti-peeping display system to rotate at a same angular velocity; when the obtained display password is different from the default display password and/or the obtained glasses password is different from the default glasses password, controlling the first polarizer and the second polarizer to rotate at different angular velocities.

14. The anti-peeping display method according to claim 13, wherein there is a buffer time between issuing the instruction for inputting a display password as well as the instruction for inputting a glasses password, and obtaining the input display password and the input glasses password; when not obtaining the display password and the glasses password after the buffer time, controlling the first polarizer and the second polarizer to rotate at different angular velocities.

15. The anti-peeping display method according to claim 14, wherein after controlling the first polarizer and the second polarizer to rotate at different angular velocities for a preset time, shutting down the anti-peeping display system.

16. The anti-peeping display method according to claim 13, wherein when the anti-peeping display system shuts shown, restoring the first polarizer and the second polarizer to a state in which polarizing axes of the first polarizer and the second polarizer are perpendicular to each other.

17. The anti-peeping display method according to claim 13, wherein the controlling the first polarizer and the second polarizer to rotate at different angular velocities comprises:
making the angular velocity of the first polarizer greater than zero, and making the angular velocity of the second polarizer equal to zero.

* * * * *